(12) United States Patent
Van Huis

(10) Patent No.: US 7,914,239 B2
(45) Date of Patent: Mar. 29, 2011

(54) CONVEYANCE SYSTEM FOR WEB OF PACKAGING CUSHIONS

(75) Inventor: Paul Van Huis, Whithall, NY (US)

(73) Assignee: Sealed Air Corporation (US), Elmwood Park, NJ (US)

( * ) Notice: Subject to any disclaimer, the term of this patent is extended or adjusted under 35 U.S.C. 154(b) by 460 days.

(21) Appl. No.: 12/004,302

(22) Filed: Dec. 20, 2007

(65) Prior Publication Data

US 2009/0159403 A1 Jun. 25, 2009

(51) Int. Cl.
*B65G 53/16* (2006.01)
(52) U.S. Cl. .......... 406/88; 226/97.1; 226/97.3; 53/403
(58) Field of Classification Search .................. 406/88; 198/369.2, 436, 575, 592; 226/97.1, 97.3; 53/472, 403, 139.5
See application file for complete search history.

(56) References Cited

U.S. PATENT DOCUMENTS

| | | | |
|---|---|---|---|
| 4,422,565 A * | 12/1983 | Reba | 226/97.4 |
| 5,942,076 A | 8/1999 | Salerno et al. | |
| 6,428,246 B1 * | 8/2002 | Landrum | 406/197 |
| 6,453,644 B1 | 9/2002 | Baker | |
| 6,519,916 B1 | 2/2003 | Brown | |
| 6,536,183 B1 | 3/2003 | Brown | |
| 6,598,373 B2 | 7/2003 | Sperry et al. | |
| 6,651,406 B2 | 11/2003 | Sperry et al. | |
| 6,804,933 B2 | 10/2004 | Sperry et al. | |
| 6,910,610 B2 * | 6/2005 | Bartlett et al. | 226/97.1 |
| 6,996,955 B2 | 2/2006 | White, Jr. et al. | |
| 7,165,375 B2 | 1/2007 | O'Dowd | |
| 7,220,476 B2 | 5/2007 | Sperry et al. | |
| 7,231,749 B2 | 6/2007 | Garceau et al. | |
| 7,273,142 B2 | 9/2007 | Huis et al. | |
| 2006/0289108 A1 | 12/2006 | McNamara, Jr. et al. | |

* cited by examiner

*Primary Examiner* — Douglas A Hess
(74) *Attorney, Agent, or Firm* — Daniel B. Ruble

(57) ABSTRACT

A conveyance system comprises a production machine for manufacturing a web of packaging cushions, a duct downstream from the production machine, a blower to provide an air flow through the duct to apply a conveyance force for conveying the web of packaging cushions, and a friction contact area downstream from the production machine and upstream from the duct entrance. The web of packaging cushions passes beneath and contacts the friction contact area to create a friction force opposing the conveyance force so that the conveyance force is not transmitted along the web of packaging cushions to the production machine.

14 Claims, 9 Drawing Sheets

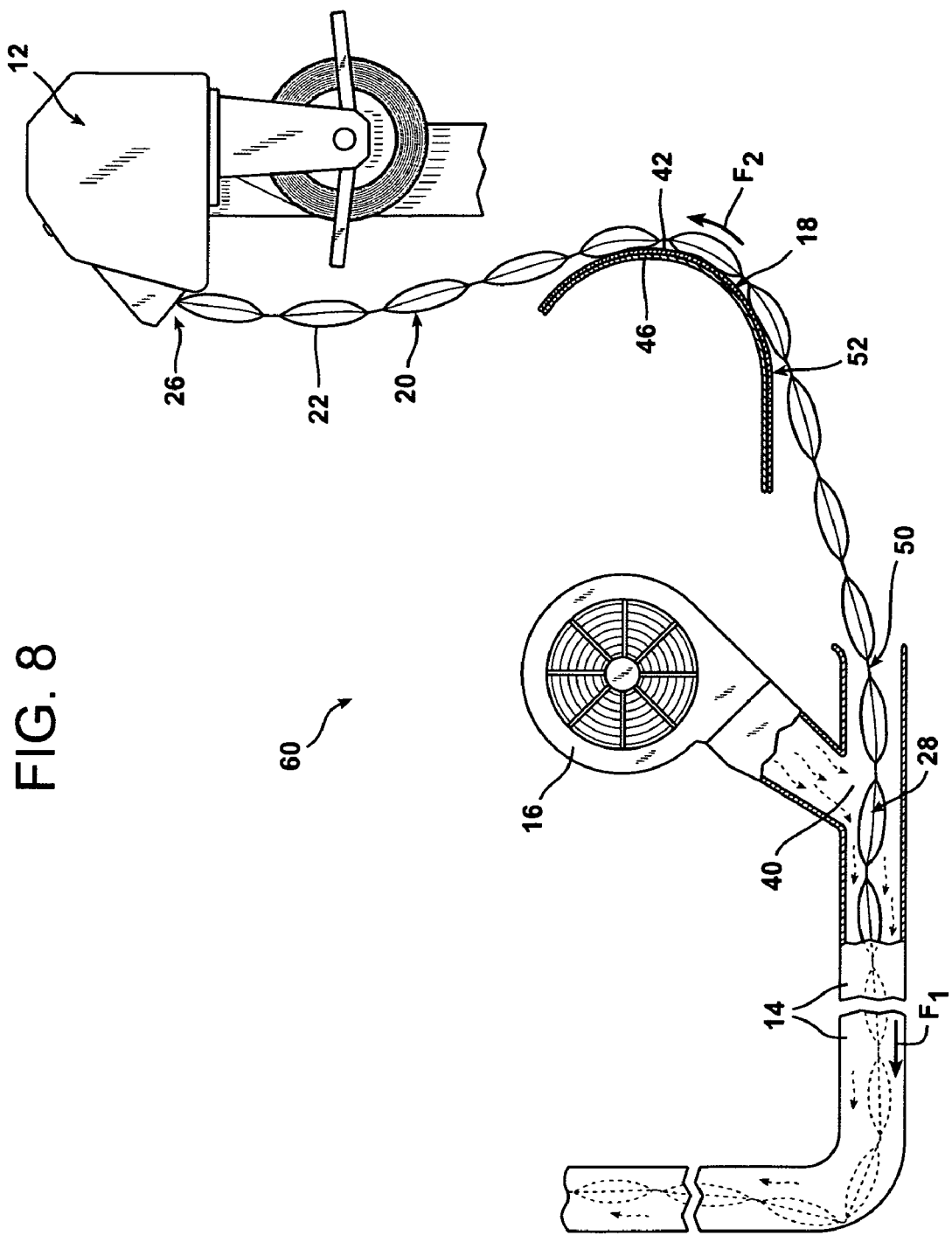

CONVEYANCE SYSTEM FOR WEB OF PACKAGING CUSHIONS

BACKGROUND

The present invention relates to conveyance systems for packaging cushions.

SUMMARY

An embodiment of the invention is directed to a conveyance system 10 for conveying a web of packaging cushions 20. The system comprises a production machine 12 capable of manufacturing the web of packaging cushions. A duct 14 is downstream from the production machine. The duct has an entrance through which the web of packaging cushions can be drawn from the production machine into the duct. A blower 16 provides an air flow through the duct to apply a conveyance force to the web for conveying the web of packaging cushions through the duct. A friction contact area 18 downstream from the production machine and upstream from the duct entrance is arranged so that (i) the web of packaging cushions passes beneath and contacts the friction contact area as the web of packaging cushions passes from the production machine to the duct entrance and (ii) the contact between the web of packaging cushions and the friction contact area creates a friction force opposing the conveyance force so that the conveyance force is not transmitted along the web of packaging cushions to the production machine.

The conveyance system may be useful to make and deliver webs of packaging cushions to one or more locations remote from the production machine 12 while also damping or averting the conveyance force from transmission upstream along the web of packaging cushions to the production machine. This may help avoid the conveyance force from otherwise potentially adversely affecting the operation of production machine 12.

BRIEF DESCRIPTION OF THE DRAWINGS

FIG. 8 is a representative view of system 60, an embodiment of the present invention.

DETAILED DESCRIPTION

Figure 1:
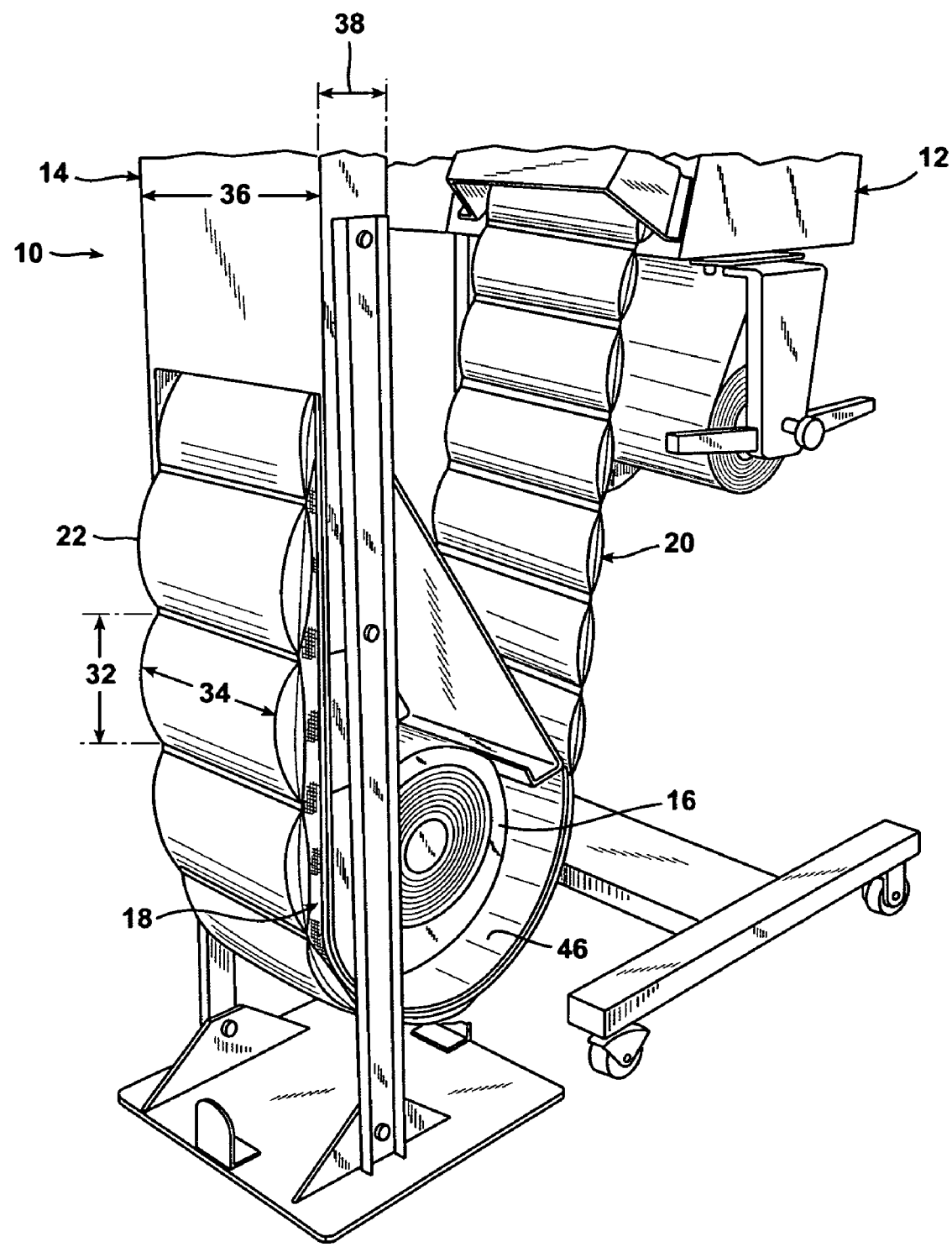
FIG. 1 is a perspective representative view of system 10, an embodiment of the present invention.
Figure 2:
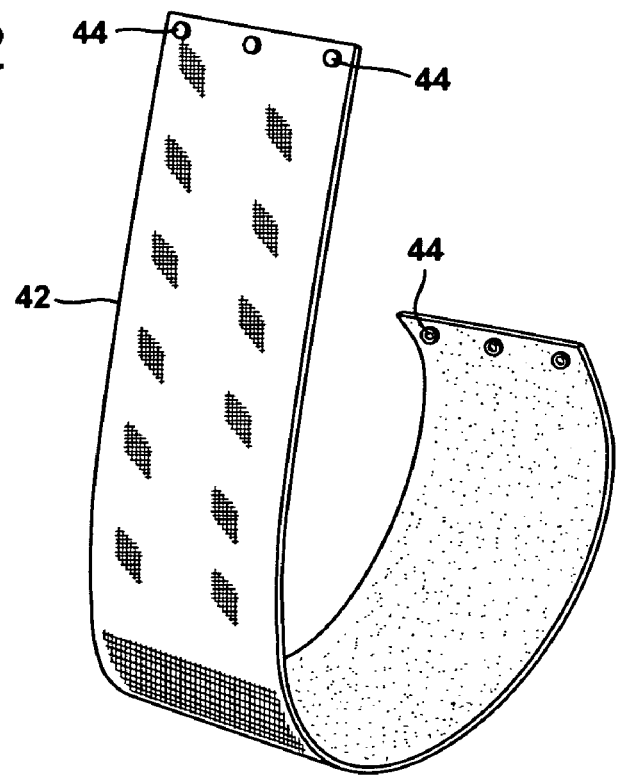
FIG. 2 is a perspective representative view of a friction contact area mat.
Figure 3:
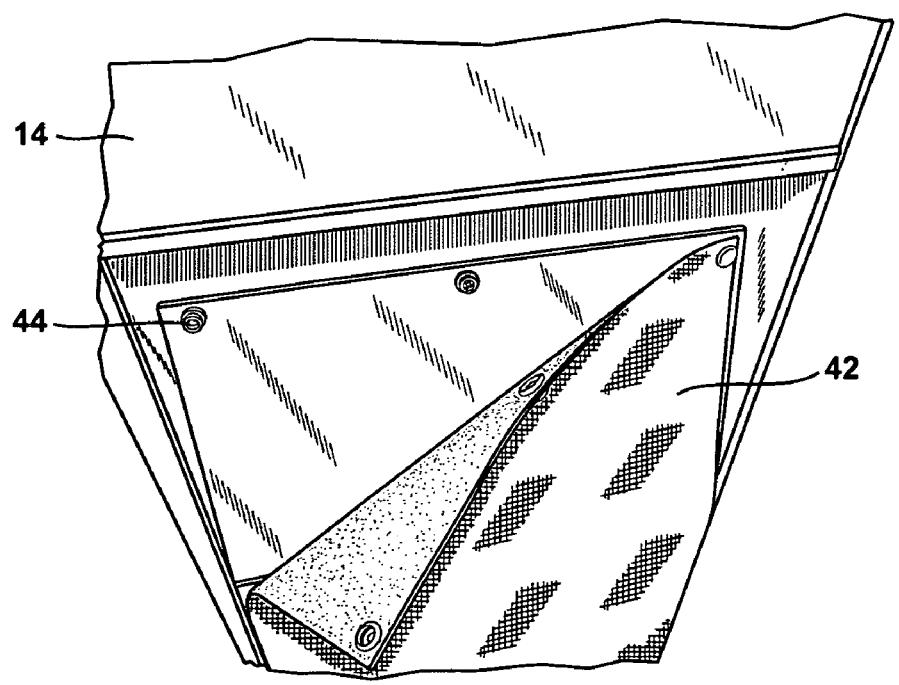
FIG. 3 is a representative view of a duct entrance having the mat of the friction contact area partially removed.
Figure 4:
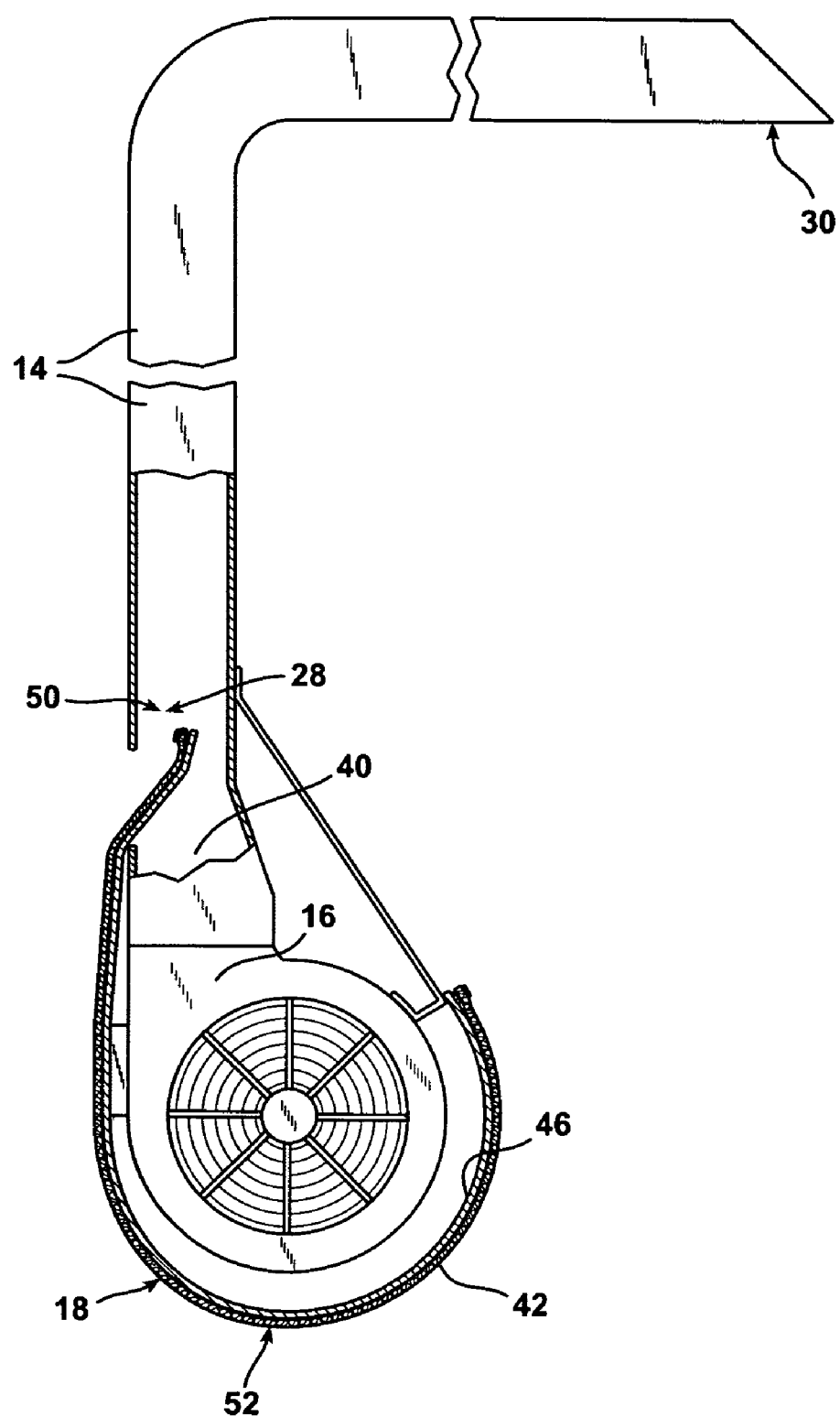
FIG. 4 is a representative side view of a portion of system 10.

Embodiments of the present invention are conveyance system 10 (FIGS. 1, 5-6), conveyance system 60 (FIG. 8), conveyance system 62 (FIG. 9), and conveyance system 66 (FIG. 10), which comprise production machine 12, duct 14, blower 16, and friction contact area 18. The conveyance system may be used to transport a web of packaging cushions 20 from the production machine 12 to a desired location.

Production Machine

Figure 11:
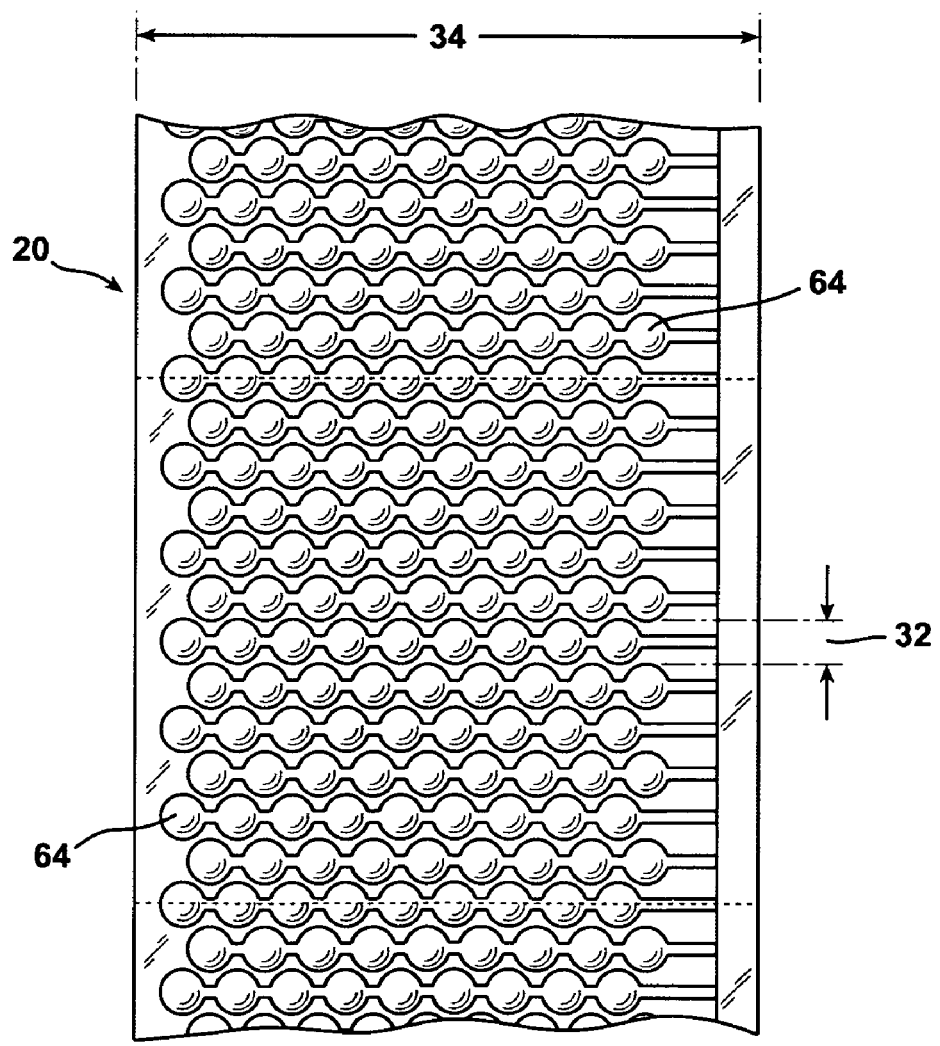
FIG. 11 is a representative perspective view of an extended sheet of inflated air-cellular cushioning material having inflated rows as a web of packaging cushions.

Systems 10, 60, 62, and 66 comprise production machine 12 capable of manufacturing a web of packaging cushions. (FIGS. 1, 5-6, 8-10) The web of packaging cushions 20 may comprise an extended string of packaging cushions, for example, as illustrated in FIGS. 1, 5-6, and 8-10, or may comprise an extended sheet (or connected sheets) of inflated air-cellular cushioning material, for example, as illustrated in FIG. 11. Where the web of packaging cushions comprises a string of packaging cushions, each cushion 22 of the string of packaging cushions may be connected to at least one other adjoining cushion of the string. The string of packaging cushions may comprise air-filled cushions, foam-filled cushions, as well as cushions comprising other types of packaging materials. The web of packaging cushions may be useful in or adapted for packaging dunnage applications. The cushions 22 may have an average length 32 in the machine direction of, for example, at least about and/or at most about any of the following: 4, 8, 12, 14, and 16 inches. The rows 64 may have an average length 32 in the machine direction of, for example, from about 0.75 to about 2 inches. The web 20 may have an average width 34 in the transverse direction of from about 8 inches to about 20 inches. The web may have an inflated height of from about 1¼ inches to about 3½ inches.

The web of packaging cushions 20 may include perforations (not illustrated) periodically along the web, for example, between adjacent cushions 22 of the string, to facilitate separation of the web into web segments or into one or more individual cushions. "Perforations" as used herein includes scoring or other lines of weakening adapted for the purpose of facilitating separation of the web of packaging cushions.

Exemplary webs of packaging cushions are sold, for example, by Sealed Air Corporation as strings of air-filled dunnage cushions under the Fill-Air® family of trademarks and as extended sheets of cushioning material under the NewAir I.B.® and Barrier Bubble® family of trademarks. Exemplary production machines capable of producing a web of packaging cushions include those sold by Sealed Air Corporation (i) under the Fill-Air® 1000, Fill-Air® 2000, Fill-Air® NTS, and Fill-Air Elite® trademarks for producing a string of air-filled packaging cushions and (ii) under the NewAir I.B.® 200 and NewAir I.B.® 600 trademarks for producing an extended sheet of inflated air-cellular cushioning material. Further examples of useful webs of packaging cushions and the machines for making them are disclosed in U.S. Pat. Nos. 5,942,076; 6,598,373; 6,651,406; 6,804,933; 6,996,955; 7,231,749; 7,273,142; 7,220,476; 7,165,375; and U.S. Patent Application Publication 2006/0289108 A1, each of which is incorporated herein in its entirety by reference.

In the case of production of air-filled packaging cushions, the production machine may use as feed stock a web of sheet material that the machine folds, partially seals, inflates, and then finally seals the material to form the string of packaging cushions, as is known in the art. The machine may use as feedstock a web of sheet material that has been partially converted by, for example, folding, sealing, and perforating, before the feedstock enters the machine, also as is known in the art. Suitable materials for the sheet material include polymer plastics, such as thermoplastics, as is known in the art.

Production machine 12 defines a manufactured web outlet elevation 26, which is the elevation at which the creation of each new air-filled cushion 22 (FIG. 5) or inflated row 64 (FIG. 11) of the web of packaging cushions 20 is completed and supplied by machine 12.

Duct

A duct 14 is downstream from the production machine 12 so that the web of packaging cushions 20 manufactured at the production machine can be drawn into the duct at duct entrance 28 (defined below). The duct 14 has duct exit 30 through which the web of packaging cushions may leave the duct. The duct 14 may have multiple intermediate exits (not illustrated) between the entrance 28 and exit 30, as described in U.S. Pat. No. 6,699,955, which was previously incorporated in its entirety by reference. The duct 14 may be configured for overhead conveyance of the web of packaging cushions to desired locations, for example, to one or more hoppers (not illustrated) located remotely from the production machine 12.

The duct may be made of any suitable material, such as metal, for example steel (e.g., galvanized steel or powder-coated steel) or aluminum alloy (e.g., polished aluminum). The duct walls may have a thickness of, for example, from about 0.03 to about 0.5 inches. The duct may have a rectangular-shaped cross section, so that the width 36 of the duct may generally correspond to the width 34 of the web of packaging cushions, for example, being from about 1 to about 4 inches wider than the width 34 of the web. The height 38 of the duct may similarly correspond to the height of the web, for example, the height of air-filled packaging cushion 22 or inflated row 64. The duct may have a circular cross section, for example having a diameter of, for example, from about 8 to about 12 inches.

Blower

Figure 5:
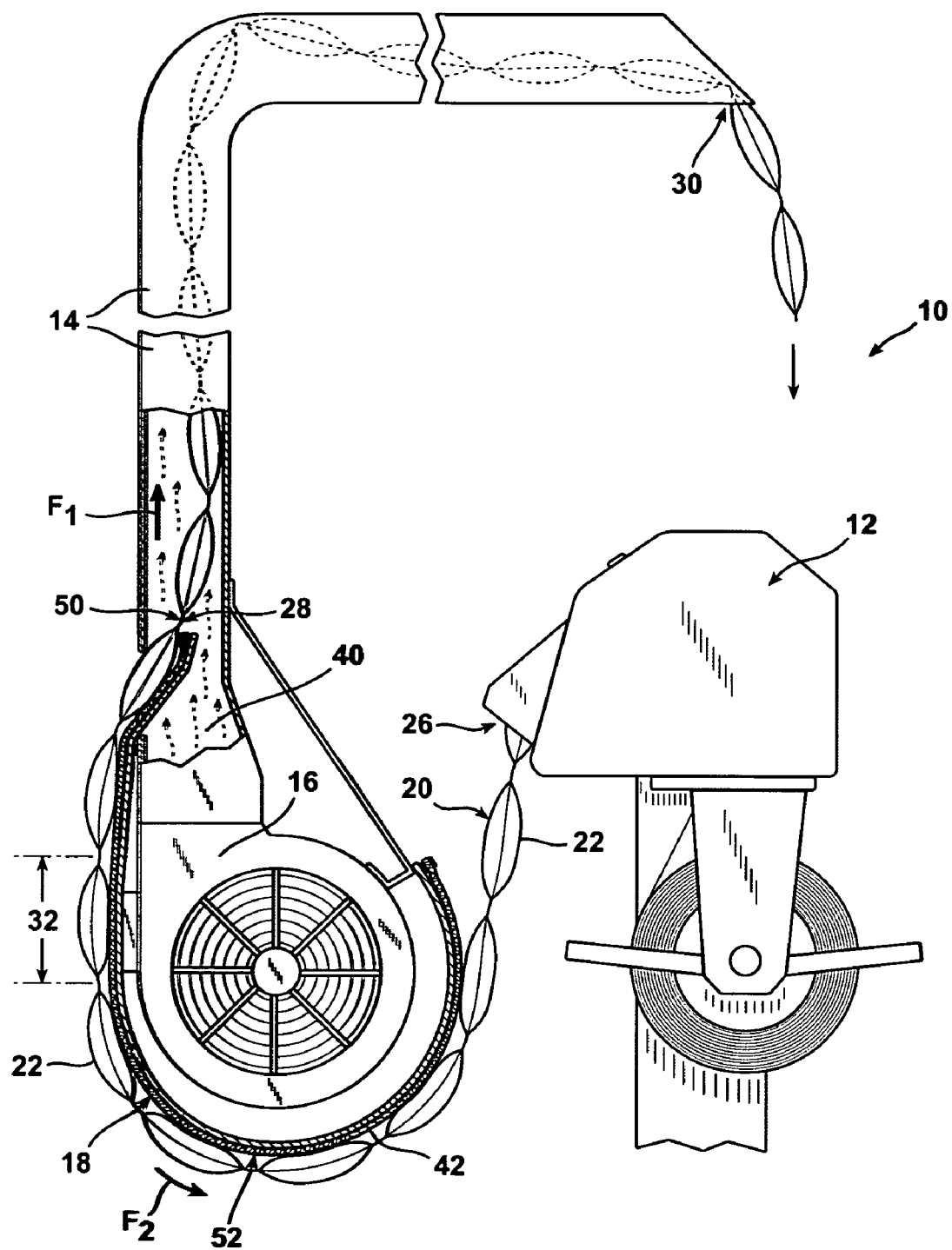
FIG. 5 is a representative side elevation view of system 10.

Blower 16 provides the motive fluid of an air flow through the duct to apply a conveyance force ($F_1$) to the web for conveying the web of packaging cushions through the duct. (FIG. 5.) The outlet 40 of blower 16 is connected to duct 14 so that the air flow created by blower 16 is in fluid communication with duct 14. The blower and duct combine to form in essence an ejector, having the air flow from the blower as the motive fluid that creates a low pressure zone that draws in and entrains the web of packaging cushions. As used herein, the "entrance" of the duct means the region of the duct adapted for the convergence of the conveyed web with the motive fluid provided by the blower.

Blower 16 has the capacity to create sufficient airflow in the duct to apply a conveyance force ($F_1$) to convey the web of packaging cushions from the entrance 28 to the exit 30. (FIG. 5.) The blower may also have the capacity to create sufficient airflow to apply the conveyance force to lift the web of cushions to the overhead height of the duct configuration. If needed to provide sufficient air flow, for example in the configuration of multiple intermediate exits, then the airflow through the duct may be supplemented by one or more booster blowers (not illustrated) located downstream from blower 16.

By way of example, useful blower airflow capacities may range from about 550 to about 1,200 cubic feet per minute. A suitable blower is available from W.W. Grainger Corporation under the model number 1TDU2 to provide an airflow for an overhead conveyance of a string of Fill-Air® cushions having a cushion length in the machine direction of about 8 inches, a transverse width of about 12 inches, and a height of about 2 inches along a duct having a length of about 40 feet, a width of about 15 inches, and a height of about 4.5 inches.

Friction Contact Area

The friction contact area 18 is downstream from the production machine 12 and upstream from the duct entrance 28. The friction contact area 18 is arranged so that the web of packaging cushions 20 passes beneath and contacts the friction contact area as the web of packaging cushions passes from the production machine 12 to the duct entrance 28. Further, the friction contact area 18 may be arranged relative to the production machine 12 and the duct entrance 28 so that the contact between the web of packaging cushions 20 and the friction contact area 18 creates a friction force ($F_2$) opposing the conveyance force ($F_1$) so that the conveyance force is not transmitted along the web of packaging cushions 20 to the production machine 12. (FIGS. 1, 5-6, 8-10.)

Figure 6:
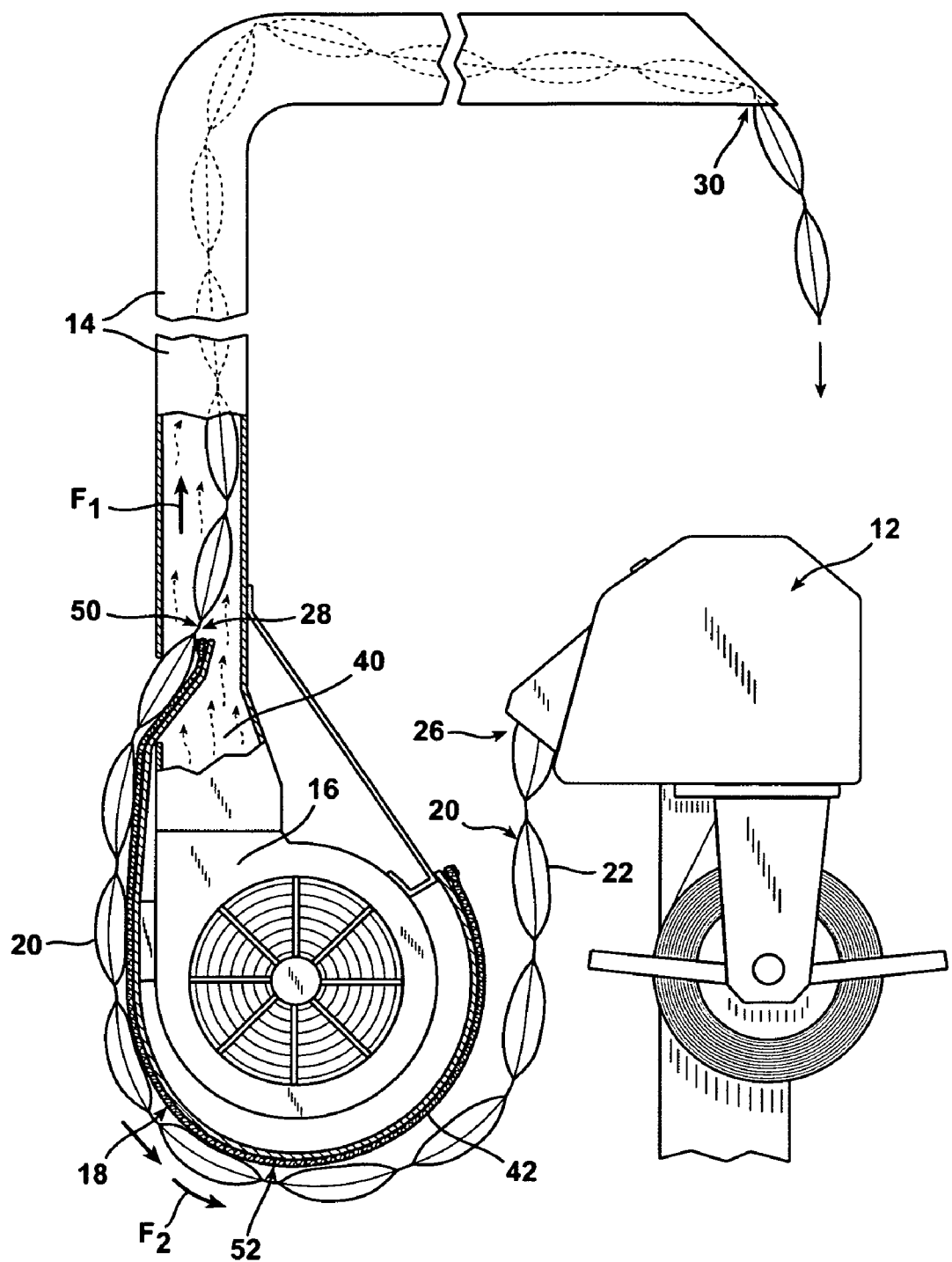
FIG. 6 is a representative side elevation view of system 10.

The friction contact area 18 may be arranged relative to the production machine 12 and the duct entrance 28 so that the manufacture of an additional length of the web of packaging cushions results in a temporary reduction in the amount of surface area of the web 20 that contacts the friction contact area—as illustrated in FIG. 6—so that the friction force ($F_2$) is reduced and the web of packaging cushions 20 advances downstream of the friction contact area 18 in an amount corresponding to the additional length.

The friction contact area 18 may be arranged relative to the production machine 12 and the duct entrance 28 so that the manufacture of an additional length of the web of packaging cushions increases the weight of the web between the friction contact area 18 and the production machine 12 so that: (i) the web hangs lower to reduce the amount of surface area of the web that contacts the friction contact area 18 (see FIG. 6) and (ii) the conveyance force ($F_1$) overcomes the friction force ($F_2$) to advance the web of packaging cushions downstream.

The elevation 50 of the duct entrance 28 may be above the elevation 52 of the friction contact area 18 taken at the lowest point of the friction contact area. (FIGS. 1, 5, 6, and 9.) Alternatively, the elevation 50 of the duct entrance 28 may be below the elevation 52 of the friction contact area 18 taken at the lowest point of the friction contact area. (FIG. 8.)

Figure 9:
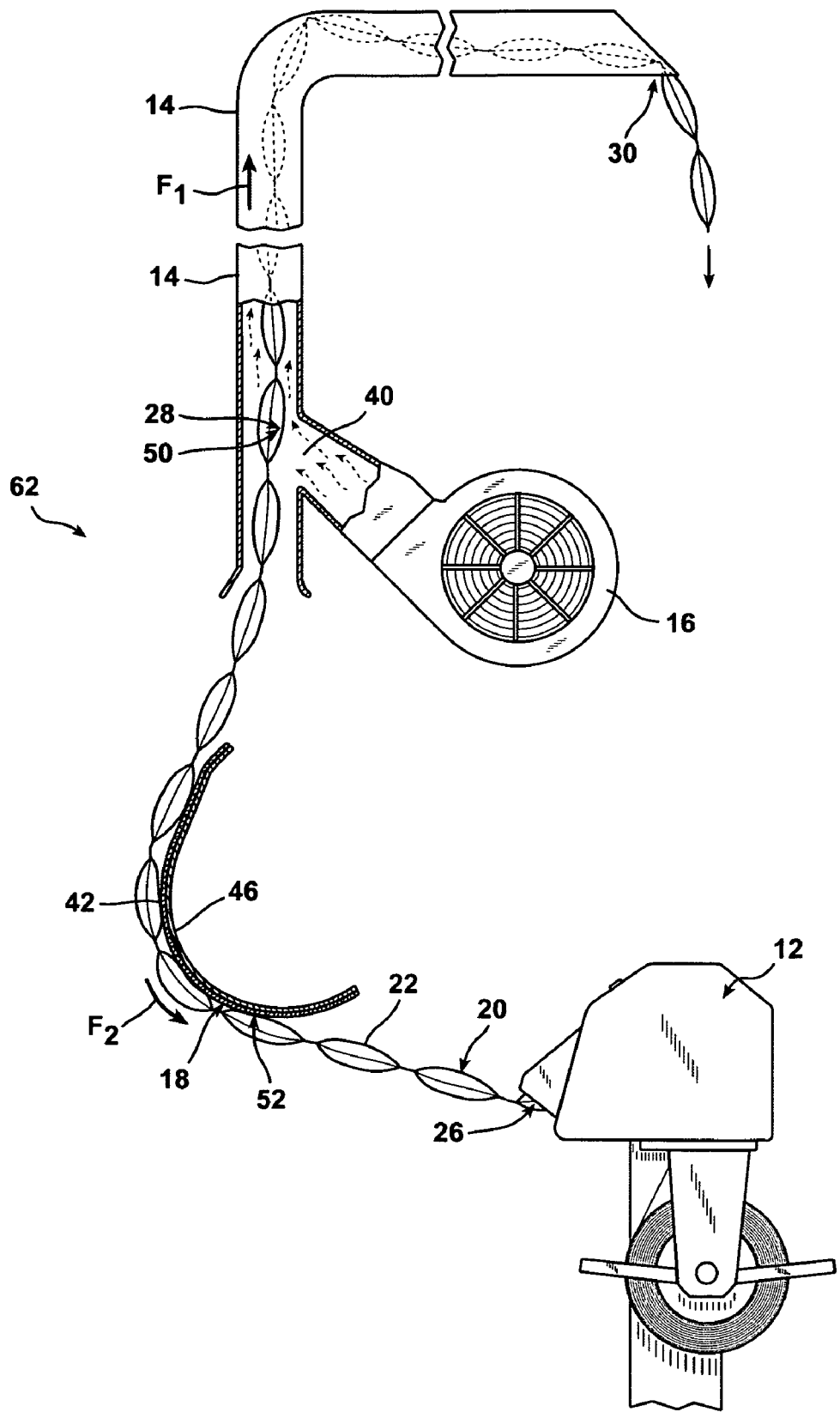
FIG. 9 is a representative view of system 62, an embodiment of the present invention.
Figure 10:
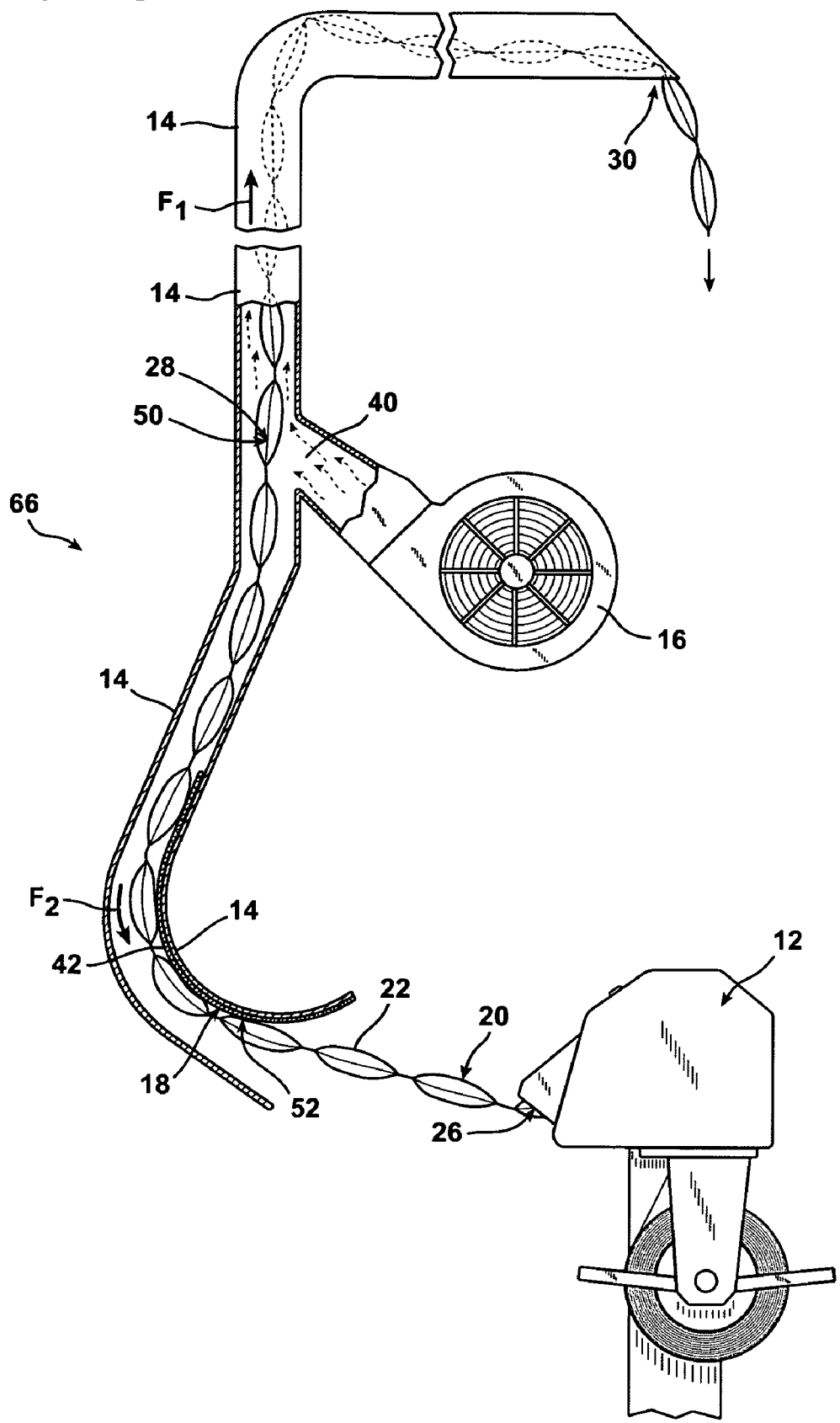
FIG. 10 is a representative view of system 66, an embodiment of the present invention.

The manufactured web outlet elevation 26 from which the manufactured web of packaging cushions passes may be above the elevation 52 of the contact friction area 18 taken at the lowest point of the friction contact area. (FIGS. 1, 5, 6, and 8.) Alternatively, the manufactured web outlet elevation 26 may be below the elevation 52 of the contact friction area 18 taken at the lowest point of the friction contact area. (FIG. 9.)

The elevation 52 of the contact friction area 18 taken at the lowest point of the friction contact area may be below either one or both of the following: (i) the manufactured web outlet elevation 26 and (ii) the elevation 50 of the duct entrance 28.

The length in the machine direction of the friction contact area 18 may be longer than the average length 32 in the machine direction of the individual packaging cushions or inflated rows that make up the web of packaging cushions. The length in the machine direction of the friction contact area 18 may be longer than the total average length 32 in the machine direction of a number of packaging cushions or rows selected from any of at least and/or at most 2, 4, 6, 8, and 10.

The friction contact area 18 may be stationary.

The friction contact area 18 may comprise primarily a first material. The duct 14 may comprise primarily a second material, such as metal, for example, aluminum alloy or any of the other duct materials discussed herein. "Primarily" in these contexts means that the surface arranged to be in contact with the web of packaging cushions comprises more than about 50 weight % of the specified material. The first material of the friction contact area may have a coefficient of friction (relative to the web of packaging cushions) that is greater than the coefficient of friction of the second material of the duct (relative to the web of packaging cushions). For example, the first material may be elastomer, and the second material may be metal that has a lower coefficient of friction relative to the web of packaging cushions.

An exemplary primary material of the friction contact area 18 is elastomer, for example, selected from one or more of any of the following: rubber (e.g., natural rubber), acrylonitrile/chloroprene copolymer, acrylonitrile/isoprene copolymer, butadiene/acrylonitrile copolymer, chlorinated polyethylene ("cPE"); chlorosulfonated polyethylene, ethylene ether polysulfide, ethylene polysulfide, ethylene/propylene copolymer ("EPC"), which includes copolymers of propylene and ethylene having a majority weight % content of propylene, ethylene/propylene/diene terpolymer (e.g., EPDM), fluoroelastomer, fluorosilicone, hexafluoropropylene/vinylidene fluoride copolymer, isobutene/isoprene copolymer, organopolysiloxane, acrylic ester/butadiene copolymer, polybutadiene, polychloroprene, polyepichlorohydrin, polyisobutene, polyisoprene (natural or synthetic), polyurethane (polyester or polyether), polyurethane (polyether and polyester), polyethylene-butyl graft copolymer, styrenic copolymers (e.g., styrene/butadiene copolymer, stryene/chloroprene copolymer, and styrenic block copolymers, such as styrene/butadiene/styrene copolymer ("SBS"), styrene/isoprene/styrene copolymer ("SIS"), styrene/ethylene-butylene/styrene copolymer ("SEBS"), styrene/ethylene-propylene/styrene ("SEPS"), and styrene/ethylene-propylene copolymer ("SEP")), ethylene/unsaturated ester copolymer (e.g., ethylene/methyl acrylate copolymer, ethylene/methyl methacrylate copolymer, ethylene/ethyl acrylate copolymer, ethylene/ethyl methacrylate copolymer, ethylene/butyl acrylate copolymer, ethylene/2-ethylhexyl methacrylate copolymer, and ethylene/vinyl acetate copolymer ("EVA")), ethylene/(meth)acrylic acid copolymer (i.e., the copolymer of ethylene and acrylic acid, methacrylic acid, or both), ethylene/alpha-olefin copolymers ("EAOs") having an average density, for example, of at most about 0.912 g/cm$^3$.

"Copolymer" as used in this application means a polymer derived from two or more types of monomers, and includes terpolymers, etc. The monomer listed first in the name of the polymer does not necessarily mean that that monomer is present in a majority amount (e.g., "ethylene/propylene copolymer" includes copolymer having 85 weight percent propylene monomer.)

The primary material of the friction contact area 18 may comprise a textile material, for example comprising primarily any of the following: (i) natural fiber, such as primarily any of cotton or wool, or (ii) synthetic fiber, such as primarily any of nylon, rayon, polyester, or aramid (such as Kevlar® brand aramid fiber). The primary material of the friction contact area 18 may comprise primarily any of leather or cork materials.

The friction contact area may comprise primarily material having a configuration selected from any of the following: woven (as in some carpets), non-woven (such as felt materials), tufted (as in some carpets), hooked (as in some rugs), and molded (as is useful for thermoplastics).

The friction contact area may comprise a mat 42. The mat 42 may comprise any of the primary materials or configurations discussed above, and may further comprise a substrate, for example of fiberglass or textile material, to provide strength to the mat. For example, mat 42 may comprise a conveyor belt material, for example, such as that available from Ammeraal Beltech Corporation under the FLEXAM EM 7/2 0+A34 D trade name.

The mat 42 may be supported by and/or attached to guide 46, which positions mat 42 so that the web of packaging cushions passes beneath and contacts mat 42 as the web passes from the production machine to the duct entrance.

The mat 42 may be removably attached, which means that the mat may be relatively easily removed from the system without damaging the mat or the remainder of the system so that the mat may be readily replaced if it wears to an unacceptable degree. For example, mat 42 may be attached to system 10 by one or more snaps 44 or clips (not illustrated), or by a hook and loop material (not illustrated).

Figure 7:
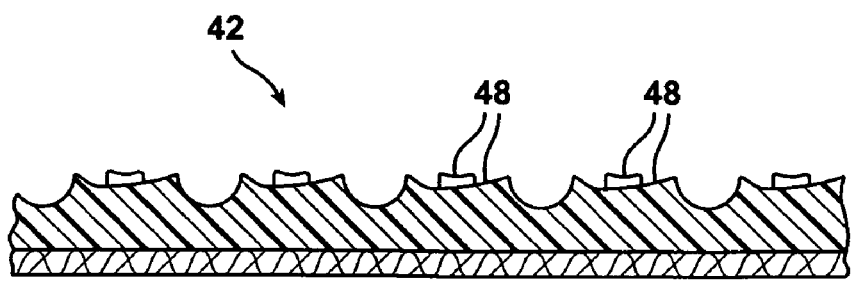
FIG. 7 is a perspective portion of the mat 42 of FIG. 1.

The friction contact area 18 may comprise a textured surface, for example, having a plurality of ridges or raised protrusions 48 so that the surface is not smooth, or is relatively rough or course compared to the surface of the duct contacting the web of packaging cushions. (FIG. 7.) The protrusions may average from about 0.1 to about 0.8 inches in any of the length, width, and/or height dimensions. The friction force created by the textured surface of the friction contact area may be greater than the friction force created by the same friction contact area but without the textured surface (i.e., having a smooth surface).

Operation

In operating the conveyance system, the production machine 12 manufactures a web of packaging cushions 20. The web passes beneath and contacts the friction contact area 18 as the web of packaging cushions passes from the production machine 12 to the duct entrance 28. The contact between the web of packaging cushions 20 and the friction contact area 18 creates a friction force ($F_2$) opposing the conveyance force ($F_1$) so that the conveyance force is not transmitted upstream along the web of packaging cushions to the production machine 12.

The web of packaging cushions 20 is drawn to duct entrance 28 by converging with the motive fluid of air flow provided in the duct by blower 16. Duct entrance 28 is downstream from both the production machine 12 and the friction contact area 18. The air flow through the duct 14 applies a conveyance force ($F_1$) to the web to convey the web of packaging cushions 20 through the duct 14.

In operation, the manufacture of an additional length of the web of packaging cushions 20 from production machine 12 results in a temporary reduction in the amount of surface area of the web that contacts the friction contact area 18, so that the friction force ($F_2$) is reduced. This is believed to be because the additional length of the web of packaging cushions 20 increases the weight of the web between the friction contact area 18 and the production machine 12 so that the web hangs lower to reduce the amount of surface area of the web that contacts the friction contact area 18. (See FIG. 6, which is shown in exaggerated configuration to enhance clarity). As a result, the conveyance force ($F_1$) overcomes the friction force ($F_2$) to advance the web of packaging cushions downstream. The advancement length downstream of the friction contact area 18 generally corresponds to the additional length of the manufactured web. This result can repeat in relatively quick succession so that the conveyance may operate fairly smoothly.

The system is useful to make and delivering webs of packaging cushions to one or more locations remote from the production machine 12, while damping or averting the conveyance force from transmission upstream along the web of packaging cushions to production machine 12, thereby avoiding an adverse effect by the conveyance force on the operation of production machine 12.

The following provides additional description of various embodiments of the invention.

A. A conveyance system for conveying a web of packaging cushions, the system comprising: (1) a production machine capable of manufacturing the web of packaging cushions; (2) a duct downstream from the production machine, the duct having an entrance through which the web of packaging cushions can be drawn from the production machine; (3) a blower to provide an air flow through the duct to apply a conveyance force to the web for conveying the web of packaging cushions through the duct; and (4) a friction contact area downstream from the production machine and upstream from the duct entrance arranged so that (i) the web of packaging cushions passes beneath and contacts the friction contact area as the web of packaging cushions passes from the production machine to the duct entrance and (ii) the contact between the web of packaging cushions and the friction contact area creates a friction force opposing the conveyance force so that the conveyance force is not transmitted along the web of packaging cushions to the production machine.

B. The system described in paragraph B wherein the friction contact area is arranged relative to the production machine and the duct entrance so that the manufacture of an additional length of the web of packaging cushions results in a temporary reduction in the amount of surface area of the web that contacts the friction contact area so that the friction force is reduced and the web of packaging cushions advances downstream of the friction contact area in an amount corresponding to the additional length.

C. The system described in any of paragraphs A and B wherein the friction contact area is arranged relative to the production machine and the duct entrance so that the manufacture of an additional length of the web of packaging cushions increases the weight of the web between the friction contact area and the production machine so that: (i) the web hangs lower to reduce the amount of surface area of the web that contacts the friction contact area and (ii) the conveyance force overcomes the friction force to advance the web of packaging cushions downstream.

D. The system described in any of paragraphs A through C wherein: the web of packaging cushions comprises a string of air-filled packaging cushions or a web of inflated rows; and the length in the machine direction of the friction contact area is longer than the average length in the machine direction of the individual air-filled packaging cushions or inflated rows that make up the web of packaging cushions.

E. The system described in any of paragraphs A through D wherein the elevation of the duct entrance is above the elevation of the friction contact area taken at the lowest point of the friction contact area.

F. The system described in any of paragraphs A through E wherein: the production machine defines a manufactured web outlet elevation from which the manufactured web of packaging cushions passes; and the contact friction area is below the manufactured web outlet elevation.

G. The system described in any of paragraphs A through F wherein the friction contact area is stationary.

H. The system described in any of paragraphs A through G wherein the friction contact area comprises primary a material selected from any of (1) an elastomer, such as any of those described herein, (2) a textile material comprising primarily any of the following: (i) natural fiber, such as primarily any of cotton or wool, or (ii) synthetic fiber, such as primarily any of nylon, rayon, polyester, or aramid (such as Kevlar® brand aramid fiber), (3) leather, and (4) cork and/or comprises primarily material having a configuration selected from any of the following: (a) woven, (b) non-woven, (c) tufted, and (d) hooked.

I. The system described in any of paragraphs A through H wherein the friction contact area comprises a mat, for example, a removably attached mat.

J. The system described in any of paragraphs A through I wherein the friction contact area comprises a material having a textured surface to increase the friction force compared to the same material having a smooth surface.

K. The system described in any of paragraphs A through J wherein the friction contact area comprises a woven material.

L. The system described in any of paragraphs A through J wherein the friction contact area comprises a non-woven material.

M. The system described in any of paragraphs A through L wherein: the friction contact area comprises primarily a first material and the duct comprises primarily a second material; and the coefficient of friction between the first material and the web of packaging cushions is greater than the coefficient of friction between the second material and the web of packaging cushions.

The above descriptions are those of preferred embodiments of the invention. Various alterations and changes can be made without departing from the spirit and broader aspects of the invention as defined in the claims, which are to be interpreted in accordance with the principles of patent law, including the doctrine of equivalents. Except in the claims and the specific examples, or where otherwise expressly indicated, all numerical quantities in this description indicating amounts of material, use conditions, and the like, are to be understood as modified by the word "about" in describing the broadest scope of the invention. Any reference to an item in the disclosure or to an element in the claim in the singular using the articles "a," "an," "the," or "said" is not to be construed as limiting the item or element to the singular unless expressly so stated. The definitions and disclosures set forth in the present application control over any inconsistent definitions and disclosures that may exist in an incorporated reference.

What is claimed is:

1. A conveyance system for conveying a web of packaging cushions comprising a string of air-filled packaging cushions comprising individual air-filled packaging cushions or comprising individual inflated rows, the web of packaging cushions having an average length in the machine direction of the individual air-filled packaging cushions or inflated rows that make up the web of packaging cushions, the system comprising:
    a production machine capable of manufacturing the web of packaging cushions;
    a duct downstream from the production machine, the duct having an entrance through which the web of packaging cushions can be drawn from the production machine;
    a blower to provide an air flow through the duct to apply a conveyance force to the web for conveying the web of packaging cushions through the duct; and
    a friction contact area having a length in the machine direction that is longer than the average length in the machine direction of the individual air-filled packaging cushions or inflated rows that make up the web of packaging cushions, wherein the friction contact area is downstream from the production machine and upstream from the duct entrance and arranged so that the web of packaging cushions passes beneath and contacts the friction contact area as the web of packaging cushions passes from the production machine to the duct entrance, wherein:

the friction contact area comprises primarily a first material and the duct comprises primarily a second material; and the coefficient of friction between the first material and the web of packaging cushions is greater than the coefficient of friction between the second material and the web of packaging cushions, whereby the contact between the web of packaging cushions and the friction contact area creates a friction force opposing the conveyance force so that the conveyance force is not transmitted along the web of packaging cushions to the production machine.

2. The system of claim 1 wherein the friction contact area is arranged relative to the production machine and the duct entrance so that the manufacture of an additional length of the web of packaging cushions results in a temporary reduction in the amount of surface area of the web that contacts the friction contact area so that the friction force is reduced and the web of packaging cushions advances downstream of the friction contact area in an amount corresponding to the additional length.

3. The system of claim 1 wherein the friction contact area is arranged relative to the production machine and the duct entrance so that the manufacture of an additional length of the web of packaging cushions increases the weight of the web between the friction contact area and the production machine so that: (i) the web hangs lower to reduce the amount of surface area of the web that contacts the friction contact area and (ii) the conveyance force overcomes the friction force to advance the web of packaging cushions downstream.

4. A conveyance system for conveying a web of packaging cushions the system comprising:

a production machine capable of manufacturing the web of packaging cushions;

a duct downstream from the production machine, the duct having an entrance through which the web of packaging cushions can be drawn from the production machine;

a blower to provide an air flow through the duct to apply a conveyance force to the web for conveying the web of packaging cushions through the duct; and a friction contact area downstream from the production machine and upstream from the duct entrance arranged so that (i) the web of packaging cushions passes beneath and contacts the friction contact area as the web of packaging cushions passes from the production machine to the duct entrance and (ii) the contact between the web of packaging cushions and the friction contact area creates a friction force opposing the conveyance force so that the conveyance force is not transmitted along the web of packaging cushions to the production machine, wherein the friction contact area comprises a removably attached mat.

5. The system of claim 1 wherein the elevation of the duct entrance is above the elevation of the friction contact area taken at the lowest point of the friction contact area.

6. The system of claim 1 wherein:

the production machine defines a manufactured web outlet elevation from which the manufactured web of packaging cushions passes; and the contact friction area is below the manufactured web outlet elevation.

7. The system of claim 1 wherein the friction contact area is stationary.

8. The system of claim 1 wherein the friction contact area comprises an elastomer.

9. The system of claim 1 wherein the friction contact area comprises a material having a textured surface to increase the friction force compared to the same material having a smooth surface.

10. The system of claim 1 wherein the friction contact area comprises a woven material.

11. The system of claim 1 wherein the friction contact area comprises a non-woven material.

12. The system of claim 1 wherein the friction contact area comprises a removably attached mat.

13. The system of claim 4 wherein:

the web of packaging cushions comprises a string of air-filled packaging cushions comprising individual air-filled packaging cushions or comprising individual inflated rows, the web of packaging cushions having an average length in the machine direction of the individual air-filled packaging cushions or inflated rows that make up the web of packaging cushions; and the length in the machine direction of the friction contact area is longer than the average length in the machine direction of the individual air-filled packaging cushions or inflated rows that make up the web of packaging cushions.

14. The system of claim 4 wherein:

the friction contact area comprises primarily a first material and the duct comprises primarily a second material; and the coefficient of friction between the first material and the web of packaging cushions is greater than the coefficient of friction between the second material and the web of packaging cushions.

* * * * *